Dec. 21, 1965  KARL-JÜRGEN BRAMEKAMP ET AL  3,224,215
PROCESS AND DEVICE FOR COOLING A HOT GAS
MIXTURE CONTAINING TIO₂
Filed Dec. 19, 1963                               2 Sheets-Sheet 2

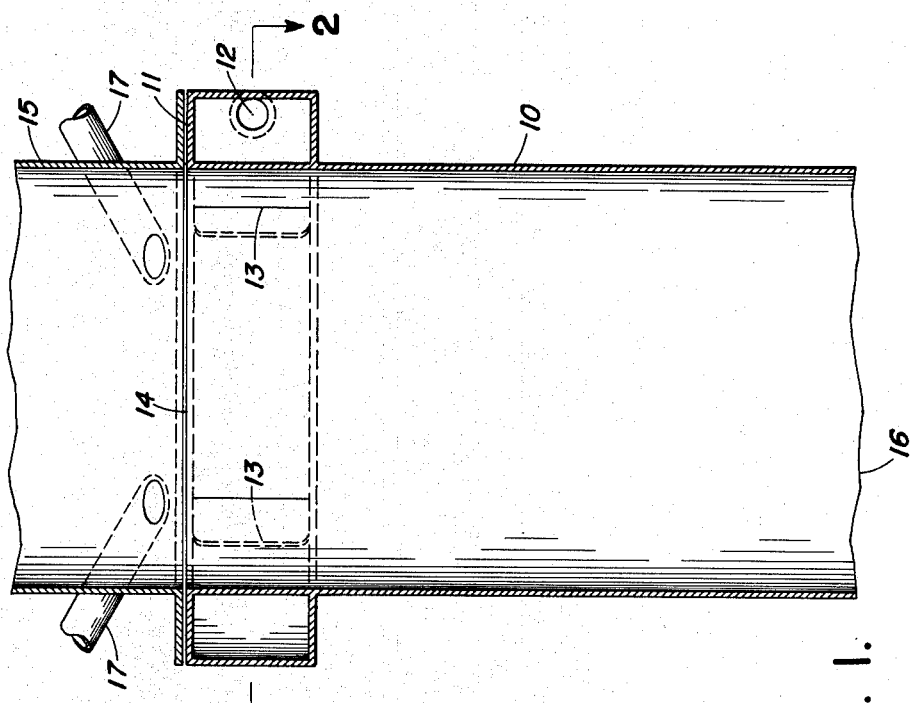
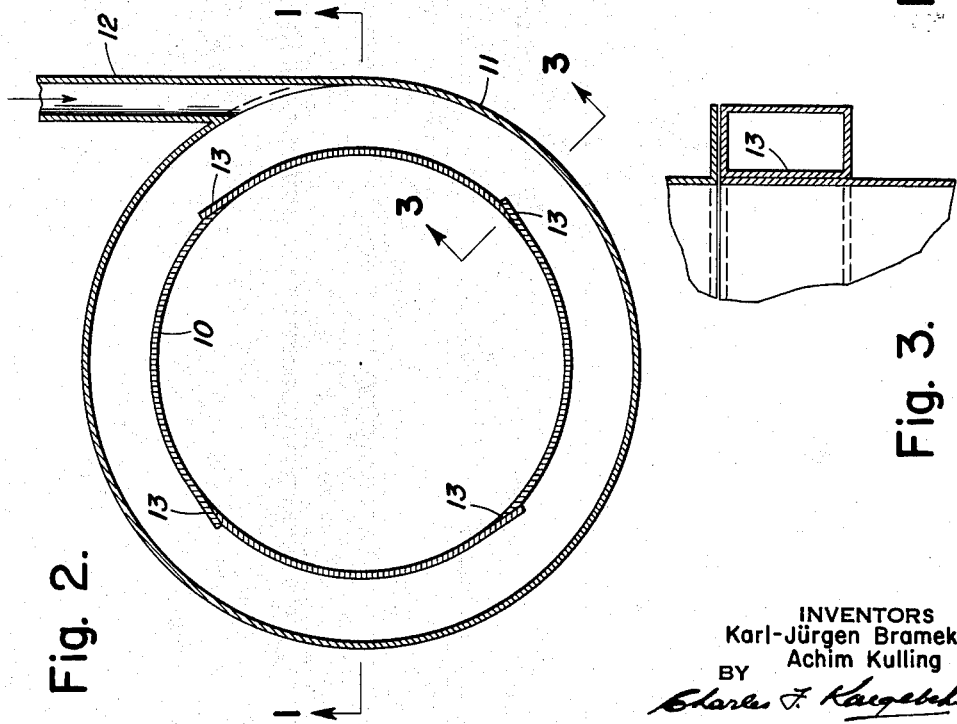
INVENTORS
Karl-Jürgen Bramekamp
Achim Kulling

INVENTORS
Karl-Jürgen Bramekamp
Achim Kulling
BY
ATTORNEY

3,224,215
PROCESS AND DEVICE FOR COOLING A HOT GAS MIXTURE CONTAINING TiO₂
Karl-Jürgen Bramekamp and Achim Kulling, Leverkusen, Germany, assignors to Titangesellschaft m.b.H., Leverkusen, Germany, a corporation of Germany
Filed Dec. 19, 1963, Ser. No. 331,825
Claims priority, application Germany, Dec. 24, 1962, T 23,262
11 Claims. (Cl. 62—120)

The instant invention relates in general to the recovery of the oxides produced by the vapor phase oxidation of metal chlorides and in particular to an improved method and apparatus for cooling the hot reaction gases, containing solid particles of $TiO_2$, produced by the vapor phase decomposition of volatile titanium tetrachloride in the presence of an auxiliary flame.

In the vapor phase oxidation of $TiCl_4$ to produce $TiO_2$ in finely divided form suitable for use as a pigmentary material, gaseous $TiCl_4$ and oxygen or oxygen-containing gases are fed continuously and simultaneously into a reaction chamber maintained at a temperature within the range of from 1000° C. to more than 1400° C. and reacted to produce finely divided particles of $TiO_2$ suspended in the reaction gases. The heat required to sustain the reaction may be supplied in part by preheating the gaseous $TiCl_4$ and oxygen or oxygen-containing gases, and in part by external heating means; or may be supplied, in the main, by an auxiliary flame produced by burning carbon monoxide within the reaction zone.

The combustion products produced within the reaction chamber include particles of finely divided $TiO_2$, gaseous chlorine carbon dioxide and possibly other residual gases dependent on the reactants fed to the reactor. Included among these residual gases may be slight amounts of unreacted starting materials and, if air is used as the oxidizing gas, nitrogen.

Because of the high temperature of these hot reaction gases, their corrosive nature and the necessity for preventing grain growth of the $TiO_2$ such as would impair pigment quality, it is necessary to cool the gases rapidly to a temperature below about 700° C. before separating the solid $TiO_2$ therefrom.

Cooling these hot reaction gases rapidly prior to removal of the suspended $TiO_2$ has proven to be a difficult problem due primarily to the fact that the suspended $TiO_2$ is pulverulent, is of extremely fine particle size and is sticky. As a consequence it covers and adheres to all surfaces with which it comes into contact forming thereon a heat insulating layer which, for all practical purposes prevents indirect heat exchange. Many proposals have been made for cooling these reaction gases as for example, passing the hot reaction gases at high velocity through a long conduit or series of conduits having externally cooled walls. For reasons of space, economy and sturdy construction these conduits are usually set up as a plurality of vertical components connected in series by U bends. The conduits are fabricated from any suitable metal which has good thermal conductivity and resistance to corrosion, such as aluminum, and is liquid cooled externally. To counteract the tendency of the suspended $TiO_2$ to collect on the walls of the conduits it has been the practice to pass hard, sharp-edge $TiO_2$ particles, or other inert abrasive materials such as sand, through the conduits at the same time the hot reaction gases are being passed therethrough, to constantly scour the walls. However this method necessitates separating the non-pigmentary $TiO_2$ or inert scouring materials from the pigmentary $TiO_2$ and therefore decreases the overall capacity of the system.

Other methods of cooling include recycling cooled solids-free tail gases to the reaction chamber, or the introduction into the reaction chamber of cold gases such as chlorine or air; cold non-volatile solid materials, i.e. $TiO_2$, or solid materials which will volatilize to effect removal of heat, i.e. solid carbon dioxide; or relatively cold liquid coolants such as liquid chlorine, titanium tetrachloride or water.

However all of these earlier methods of cooling have been unsatisfactory. For example when recycling cooled solids-free tail gases such large volumes of gas are necessary that the concentration of $TiO_2$ in the off-gases is extremly low thus making the separation and recovery of the $TiO_2$ troublesome and expensive. As for cold solids and liquid chlorine or titanium tetrachloride the controlled, trouble-free addition of these coolants necessitates the use of expensive equipment, and cumbersome and complicated techniques.

Efforts to cool with water have encountered the problem of preventing the hot chlorine in the reaction gases from reacting with the evaporating cooling water to form HCl. When this happens the chlorine which, for economical reasons must be available for recycling to produce additional titanium tetrachloride, is for all practical purposes lost since to recover it from the hydrogen chloride necessitates additional expensive equipment which for economical reasons cannot be justified.

A solution to the problem of using water as a coolant without suffering loss of chlorine has been sought based on the knowledge that the reaction

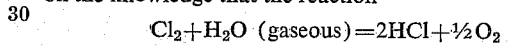
$Cl_2 + H_2O$ (gaseous) $= 2HCl + \frac{1}{2}O_2$ which is carried out in a direction opposite to the industrial Deacon process, is strongly temperature sensitive. At relatively low temperatures the equilibrium is on the side of chlorine and water vapor. At relatively high temperatures i.e. at the temperatures of the hot reaction gases containing $TiO_2$ in suspension, hydrogen chloride will be formed. This being the case it has been proposed to cool the hot reaction gases to a relatively low temperature at such a rapid rate that an appreciable reaction of chlorine and water is avoided. For this purpose systems have been designed wherein the hot reaction gases are passed directly into cooling towers having water spray means at the top for rapidly cooling (quenching) the reaction gases. The quenching of hot reaction gases containing suspended $TiO_2$ may suffice when the gas temperatures are from 1000–1200° C. However, in those systems in which the oxidation of titanium tetrachloride is carried out in the presence of an auxiliary flame produced by burning CO higher temperatures occur and in fact temperatures from 1200 to 1400° C. and above, have been measured, depending on the amount of CO used. The amount of heat to be dissipated also increases with increasing amount of CO relative to equal amounts of $TiO_2$. Hence when a spray of fine water droplets is used to quench these relatively hot reaction gas mixtures, steam is immediately produced which reacts with the chlorine, before the temperature can be effectively reduced, thereby forming hydrogen chloride. In our own experiments with the use of water for spraying relatively hot reaction gases, i.e., gases of temperatures from 1200 to 1400° C. and above, the loss of chlorine amounted to 14–20%. The chlorine loss is to be understood as the percent fraction of the chlorine evolved in the reaction that is lost by hydrogen chloride formation. No improvement was obtained by changing the experimental conditions such as increasing the amount of water, varying the manner of spraying, the location of the water spray or the direction of the spray jets.

As pointed out above the formation of hydrogen chloride is caused by the reaction of chlorine with the water vapor which is formed at the relatively high temperatures. It is quite evident from our experiments that the water spray towers of the prior art are ineffective for quenching high temperature reaction gases so as to preclude the reaction of chlorine with water vapor. The approach of this problem taken by the present invention is based on the concept of minimizing the amount of water vapor formed when cooling high temperature reaction gases containing $TiO_2$ in suspension thus minimizing the formation of hydrogen chloride.

It is therefore among the objects of this invention to provide an improved process for cooling, with water, the relatively hot reaction products produced by the oxidation of vaporous titanium tetrachloride in the presence of an auxiliary flame and containing gaseous chlorine and discrete particles of $TiO_2$ in suspension, while minimizing the formation of water vapor and thereby suppressing the conversion of chlorine to hydrogen chloride. Another object of the invention is to provide a superior method for water cooling the hot reaction products of a vapor phase oxidation of titanium tetrachloride, in the presence of an auxiliary flame and containing gaseous chlorine and discrete particles of $TiO_2$ in suspension, while maintaining the water in the form of a continuous circumambient, unbroken film.

A further object of the invention is to water-quench the hot reaction products of the vapor phase oxidation of titanium tetrachloride in the presence of an auxiliary flame, and containing gaseous chlorine and discrete particles of $TiO_2$ in suspension without forming appreciable amounts of hydrogen chloride wherein the hot reaction products are circumscribed by a continuous, unbroken moving film of cooling water maintained at a temperature not in excess of 40° C.

Still another object of the invention is to water-quench the hot reaction products of a vapor-phase oxidation of titanium tetrachloride in the presence of an auxiliary flame and containing gaseous chlorine and discrete particles of $TiO_2$ in suspension, wherein the hot reaction products are passed in heat transfer relationship through a circumambient rotating, unbroken film of cool water.

Still another object of the invention is to provide improved means for forming a circumambient, rotating unbroken film of cool water for cooling the hot reaction gases, including gaseous chlorine and particulate $TiO_2$ in suspension, produced by the vapor phase oxidation of $TiCl_4$ in the presence of an auxiliary flame without loss of chlorine.

These and other objects, features and advantages of the invention are described in greater detail in the description and examples which follow.

In the drawings:

FIG. 1 is a schematic vertical elevation, in section, of a cylindrical cooling tube and manifold used in quenching the hot reaction products produced by the vapor phase oxidation of titanium tetrachloride in the presence of an auxiliary flame.

FIG. 2 is a plan view of the cylindrical cooling tube and manifold on section line 2—2 of FIG. 1.

FIG. 3 is an enlarged cross sectional view of one of the tangential slits on line 3—3 of FIG. 2.

As pointed out above the instant invention is based on the discovery of a unique water quench of the hot reaction products of the vapor phase reaction of titanium tetrachloride and oxygen in the presence of an auxiliary flame which cools the reaction products including the suspended particles of $TiO_2$ sufficiently quickly to maintain the pigment qualities of the $TiO_2$; nor is there any significant loss of gaseous chlorine as hydrogen chloride. This discovery is particularly surprising because in general, a water film is slower and less efficient as a coolant than water spray, such as used in the water spray towers disclosed in the prior art. As related to quenching the hot reaction products of a vapor phase reaction the decisive factor is the discovery that by maintaining the quench water in the form of a substantially continuous unbroken film the amount of water converted to water vapor is kept at a minimum and hence in the absence of appreciable water vapor as reaction partner of the chlorine the formation of hydrogen chloride is suppressed.

The difference in the amount of water vapor formed when cooling the hot reaction products with water spray, on the one hand, and with a continuous flow of water on the other, can be explained by the difference in the state of dispersion of the water. Experimental work supports the discovery that the chlorine loss, which presupposes evaporation of the water to form water vapor, decreases with a decrease in the degree of dispersion of the water corresponding to the order: atomization, spraying, water film. So critical is the degree of dispersion to the formation of water vapor that increases in the loss of chlorine can be detected even when only a few water droplets are formed.

It is essential therefore to the success of the instant invention that the water film remain intact, i.e. that it does not rip open or be sprayed away such as to form water vapor. To this end it has been found necessary that the water-film retaining means should be well wetted by the water film. Moreover particularly effective water films are formed when a rotary motion is given to the water. And further since the water vapor tension increases with temperature, the temperature of water-film should not be permitted to go above about 40° C. during the quenching process the heat dissipated from the hot reaction products serving exclusively to increase the temperature of the water-film.

Figure 4:
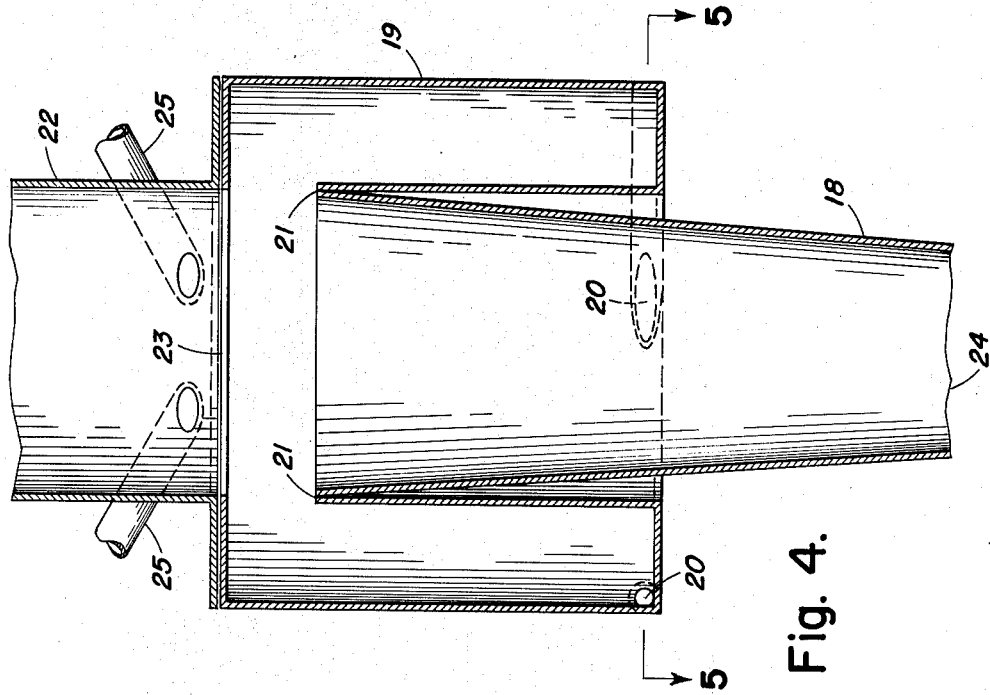
FIG. 4 is a schematic vertical elevation, in section, of a modification of the cooling tube and manifold of FIG. 1.
Figure 5:
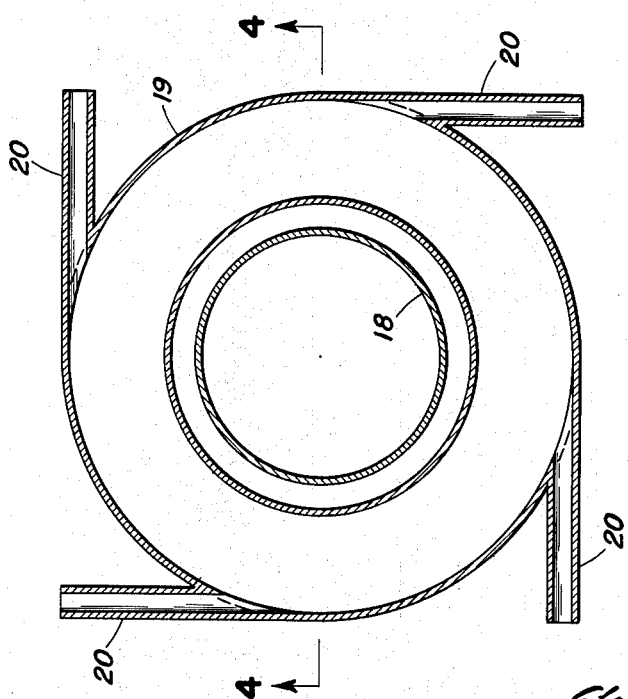
FIG. 5 is a plan view of the modified cooling tube and manifold on section line 5—5 of FIG. 4.

In addition to the necessity for maintaining the water film intact it is essential that the flow of the gas fraction, which has been cooled by the water film, be maintained as streamlined and as free from turbulence as possible for it has been found that the cooled gas fraction contains a slight amount of water vapor and hence any appreciable turbulence of these cooled gases that would carry them back into contact with the hot incoming reaction gases would result in the loss of chlorine by conversion to hydrogen chloride. It has been found that a streamline, relatively turbulent-free flow of cooled gas can be maintained to optimum advantage by forming a tubular film of water and passing the incoming hot reaction gases containing $TiO_2$ in suspension therethrough in heat transfer relationship; and at a linear velocity above about 0.5 m./sec. While a straight cylindrical cooling tube such as illustrated in FIGS. 1 and 2 will suffice to provide a tubular, circumambient water film it has been found that a cooling tube in the form of a truncated cone, such as illustrated in FIGS. 4 and 5, is particularly favorable. Not only do the conically converging walls compensate for contraction of the cooled gases but they provide better supporting surfaces for the water film. In this connection it may be seen that by passing the hot reaction products through a tube in heat transfer relationship with an unbroken water film flowing continuously over the inner surface of the tube no oxide scale, or $TiO_2$ crust can build up on the tube walls; and while a single cooling tube has been described herein it will be understood that the invention is not limited to the use of a single cooling tube and that the hot reaction products may be divided between multiple cooling tubes.

After the cooled gas mixture containing $TiO_2$ leaves the lower end of the cooling tube it is cooled to ambient temperature by any desired method and subsequently the solid $TiO_2$ particles are separated out. The residual gases which comprise mainly chlorine, oxygen and carbon dioxide are dried and may be recycled for the manufacture of titanium tetrachloride. A slight fraction of $TiO_2$ is also taken up by the water film and may be recovered from it. Since the cooling water takes up a slight amount of chlorine and hydrogen chloride, it is advantageous to recycle the cooling water so that as little as possible chlorine is lost from the system.

When using the process of this invention for cooling a mixture of hot gases containing $TiO_2$, as produced in the oxidation of gaseous titanium tetrachloride in the presence of an auxiliary flame, the chlorine loss is no more than about 3%. In this connection it has been found that the loss of chlorine may be reduced still further if the temperature of the hot reaction gases is lowered initially by mixing the gases with a cold gas prior to contacting the water film. For this purpose, air, chlorine or recycled waste gas may be used. In order to obtain this effect a volume of gas smaller than that produced by the burner, measured at normal conditions, is sufficient. The increase in the volume of the cooled gases does not entail any appreciable extra expense in the separation of $TiO_2$ and in this way the chlorine loss may be reduced to about 1%.

Turning now to the means used for carrying out the process of the instant invention:

FIG. 1 shows, schematically, a longitudinal section of one form of cooling means of this invention which in this instance is a cylindrical cooling tube 10 provided at its upper end with an integral ring-shaped manifold 11 having an inlet pipe 12 let tangentially into the outer wall thereof by which cooling water is fed continuously into the manifold 11 to flow around therein in a circular path. The upper end of the cooling tube forms the inner wall of the manifold and is provided with a plurality of slits 13 having tangentially oriented lips by means of which the effluent water circulating within the manifold is transported therefrom tangentially in the form of relatively thin films onto the inner wall of the tube 10 there to form an unbroken rotating film of water which covers the entire inner wall of the cooling tube 10. At the top of the tube 10 is an inlet 14 for the hot gases emitted from the reactor, indicated generally at 15, which gases, after passing through the cooling tube 10, are exhausted from the outlet 16 at the bottom thereof. As shown more clearly in FIG. 2 the water which passes through the transport-means, i.e. slits 13 onto the inner wall of the cooling tube, flows in a clockwise direction and, as indicated by the shape of the slits 13 in FIG. 3 is in the form of thin films.

As mentioned above it may be desirable to precool the hot reaction gases with cold recycle gases, chlorine or air prior to cooling with water and to this end suitable feed means, indicated generally by ducts 17, may be provided for introducing the cold gases or air immediately above the reaction gas inlet 14.

A modification of the cooling tube is shown in FIGS. 4 and 5. In its modified form the cooling tube is in the shape of a truncated cone 18 the upper end of which is open and surrounded by an integral annular water manifold 19. Water is fed into the manifold at the bottom thereof and tangentially thereto from four feed pipes 20 (see especially FIG. 5) and rises up within the manifold to a height corresponding to the upper open end of the tube 18 which serves as water transport means which in this instance has the form of a weir 21. Since the water feed-pipes 20 are let into the manifold 19 tangentially thereto the body of water within the manifold has a circular motion and hence as the water runs over the weir 21 it forms a rotating continuous film of water on the inner wall of the cooling tube 18.

The hot gases from the reactor, indicated generally at 22, are fed into the cooling tube 18 through an inlet opening 23 in the top of the manifold and pass down through the tube 18 to be exhausted from its open bottom end 24.

The conical cooling tube may also be adapted to operate in conjunction with precooling with a cold recycle gas, chlorine or air and to this end the reactor 22 may be provided with ducts 25—25 for introducing the cold gas or air immediately above the inlet opening 23.

It will be understood that the cooling tubes described above are illustrative only and that it is also possible to use advantageously a device in which a rotating water film is produced in a truncated cone-shaped cooling tube by providing a manifold having tangential slits: and that likewise an arrangement is possible in which a swirling body of water is made to run over a weir to form a rotating water film on the inner wall of a cylindrical cooling tube.

In order to illustrate the invention further the following examples are given of actual operating runs.

*Example I*

100 kg./hr. $TiCl_4$, 15.5 cu.m./hr. S.T.P. oxygen which had been heated to 250° C. and 6 cu.m./hr. S.T.P. CO were reacted in the gas phase. The reaction products which included $TiO_2$ in suspension had a temperature of 1250° C. and were immediately, after leaving the reaction chamber, conveyed into a cylindrical cooling tube of the design shown in FIG. 1, the length of the tube being 1.40 m. and its diameter 18 cm. Water at the rate of 6 cu.m./hr. was introduced into the manifold 11 and produced a rotating, circumambient, unbroken film of water on the inner wall of the cooling tube. The cooling water film warmed up to 19° C. The loss of chlorine was 3 percent.

*Example II*

Example I was repeated except that a cooling tube in the form shown in FIGS. 4 and 5 was used. The length of the tube was 1.40 m. Its diameter at the weir 21 was 17 cm., and at the gas outlet end 24 was 8 cm. The water source used for the production of the circumambient water film comprised an aqueous pigment suspension which originated from previous experiment and was fed into the manifold 19 at the rate of 6 cu.m./hr. Its temperature rose during the cooling reaction from 20 to 26° C. The loss of chlorine was 2.8 percent.

*Example III*

The following example was carried out in a cooling tube similar to that described in Example I. A short distance above the tangential water-transporting slits 13 of the water manifold feed ducts 17—17 were arranged for the introduction of cold air. 100 kg./hr. $TiCl_4$, 16 cu.m./hr. S.T.P. oxygen which had been heated to 250° C and 7 cu.m./hr. S.T.P. CO were reacted and the reaction products had a temperature of 1310° C. Their volume was 31.3 cu.m./hr., calculated to normal conditions. After leaving the combustion chamber the oxidation products were mixed with 30 cu.m./hr. air which had a temperature of 20° C. Subsequently the precooled gases were further cooled by contacting a rotating water-film which was fed with 6 cu.m./hr. water. The temperature of the water rose to 20° C. during the cooling process. The loss of chlorine was 1.1 percent.

*Example IV*

This experiment was carried out in a cooling tube of the type described in Example II except that feed ducts 25—25 were provided for the introduction of cold air immediately above the gas inlet of the water manifold 19. The oxidation products had a temperature of 1430° C. and were produced by the reaction of 100 kg./hr. $TiCl_4$, 17 cu.m./hr. S.T.P. oxygen heated to 250° C. and 9 cu.m./hr. S.T.P. CO. Their volume was 33.3 cu.m./hr., calculated to normal conditions Immediately after leaving the combustion chamber they were precooled with 33 cu.m./hr. air of 20° C. Subsequently the precooled gases were further cooled by contact with a rotating film of water fed at 6 cu.m./hr. The temperature of the water rose to 20° C. during the cooling process. The chlorine loss was 1 percent.

In all of the examples set out above the temperature of the cooled reaction products on leaving the cooling tube including the $TiO_2$ in suspension, remained below 600° C. and pigment quality of the $TiO_2$ was fully preserved. In order to contrast the unexpectedly new results of the instant invention with the results achieved by the prior art technique of using a water spray for quenching hot gases containing $TiO_2$ produced by the vapor phase oxidation of $TiCl_4$, an experimental run was made, as described in Example V below, using a water spray instead of a continuous water film.

*Example V*

100 kg./hr. $TiCl_4$, 16 cu.m./hr. S.T.P. oxygen heated to 250° C. and 7 cu.m./hr. S.T.P. CO were reacted. The hot oxidation products had a temperature of 1310° C. Immediately after leaving the reaction chamber the hot oxidation products were conveyed into an upright cylindrical chamber where they were sprayed with water. The spraying chamber had a diameter of 90 cm., a length of 4 m. and was provided at its upper end with an annular water manifold having spray nozzles through which 6 cu.m./hr. water were continuously sprayed. The hot reaction products were introduced into the upper open end of the water spray cylinder and the water quenched products were exhausted from the bottom end thereof. The cooled products were analyzed and found to have a chlorine loss of 15 percent.

From the foregoing description and examples it is manifest that the instant invention is the discovery of a novel method and means for cooling the hot reaction gases produced in the vapor phase oxidation of $TiCl_4$, in the presence of an auxiliary flame, without substantial losses of chlorine; and that the success of the invention over previous attempts to cool with water spray lies in the concept of minimizing the formation of water vapor during cooling, and that this has been accomplished simply, economically and on a commercial scale by passing the hot reaction gases through a circumambient, unbroken, rotating film of water in heat transfer relationship thereto. By this expedient chlorine losses have been reduced to as little as 3 percent. Moreover by combining this novel concept of water cooling with precooling the hot reactor gases with cold recycle gas or air the loss of chlorine has been reduced to as low as 1 percent.

The invention may be carried out in other specific ways than those herein set forth without departing from the spirit and essential characteristics of the invention and the present embodiments are therefore to be considered in all respects as illustrative and not restrictive and all changes coming within the meaning and equivalency range of the appended claims are intended to be embraced therein.

We claim:

1. Process for cooling hot reaction gases including gaseous chlorine and particulate $TiO_2$ in suspension produced by the vapor phase oxidation of $TiCl_4$ in the presence of an auxiliary flame which comprises: rapidly cooling said hot reaction gases without loss of chlorine by passing said hot reaction gases in heat transfer relationship through a circumambient continuously moving, unbroken film of relatively cold water.

2. Process for cooling hot reaction gases including gaseous chlorine and particulate $TiO_2$ in suspension produced by the vapor phase oxidation of $TiCl_4$ in the presence of an auxiliary flame which comprises: rapidly cooling said hot reaction gases without loss of chlorine by passing said hot reaction gases in heat transfer relationship through a circumambient continuously moving, unbroken film of relatively cold water and constricting said hot reaction gases while passing through said circumambient unbroken film of water.

3. Process for cooling hot reaction gases including gaseous chlorine and particulate $TiO_2$ in suspension produced by the vapor phase oxidation of $TiCl_4$ in the presence of an auxiliary flame which comprises: rapidly cooling said hot reaction gases without loss of chlorine by passing said hot reaction gases in heat transfer relationship through a circumambient continuously moving, unbroken film of relatively cold water, constricting said hot reaction gases while passing through said circumambient unbroken film of water and maintaining the temperature of the water no higher than about 40° C.

4. Process for cooling hot reaction gases including gaseous chlorine and particulate $TiO_2$ in suspension according to claim 1 wherein the circumambient unbroken film of water has a rotary motion.

5. Process for cooling hot reaction gases including gaseous chlorine and particulate $TiO_2$ in suspension produced by the vapor phase oxidation of $TiCl_4$ in the presence of an auxiliary flame wherein said hot reaction gases have a temperature of from 1200° C. to more than 1400° C. which comprises: rapidly cooling said hot reaction gases without loss of chlorine by passing said hot reaction gases at a linear velocity of at least about 0.5 m./sec. in heat transfer relationship through a circumambient unbroken film of water, and maintaining the temperature of water no higher than about 40° C.

6. Process for cooling hot reaction gases including gaseous chlorine and particulate $TiO_2$ in suspension according to claim 5 wherein said hot reaction gases are constricted while passing in heat transfer relationship through said circumambient unbroken film of water and said water is recovered and recycled for cooling additional hot reaction gases.

7. Process for cooling hot reaction gases including gaseous chlorine and particulate $TiO_2$ in suspension produced by the vapor phase oxidation of $TiCl_4$ in the presence of an auxiliary flame wherein said hot reaction gases have a temperature of from 1200° C. to 1400° C. and above, which comprises: rapidly cooling said hot reaction gases without loss of chlorine by initially contacting said hot reaction gases with a relatively cold gas to precool said hot reaction gases, passing said precooled reaction gases at a linear velocity of at least about 0.5 m./sec. in heat transfer relationship through a circumambient rotating, unbroken film of water, maintaining the temperature of the water no higher than about 40° C., and recovering and recycling the cooling water for cooling additional hot reaction gases.

8. Apparatus for cooling hot reaction gases including gaseous chlorine and particulate $TiO_2$ in suspension produced by the vapor phase oxidation of $TiCl_4$ in the presence of an auxiliary flame comprising: a cooling tube having an inlet and an unrestricted outlet, said tube being constructed and arranged to be connected to a vapor phase reactor whereby the hot reaction gases produced therein pass through said cooling tube from the inlet to the outlet end thereof, manifold means arranged at the inlet end of said cooling tube, a feed pipe arranged to supply cooling water continuously to said manifold said feed pipe having a tangential connection to said manifold whereby the body of cooling water in said manifold has a rotary motion, and transport means arranged between said manifold and said cooling tube for transporting water from the said rotating body of cooling water in said manifold onto the inner wall of said tube in the form of an unbroken rotating film of cooling water which circumscribes the hot reaction gases passing through said cooling tube in heat transfer relationship thereto to rapidly cool said hot reaction gases without loss of chlorine.

9. Apparatus for cooling hot reaction gases including gaseous chlorine and particulate $TiO_2$ in suspension produced by the vapor phase oxidation of $TiCl_4$ in the presence of an auxiliary flame comprising: a cooling tube having an inlet and an unrestricted outlet, said tube being constructed and arranged to be connected to a vapor phase reactor whereby the hot reaction gases produced therein pass through said cooling tube from the inlet to the outlet end thereof, manifold means arranged at the inlet end of said cooling tube, a feed pipe arranged to supply cooling water continuously to said manifold said feed pipe having a tangential connection to said manifold whereby the body of cooling water in said manifold has a rotary motion, transport means arranged between said manifold and said tube for transporting water from the said rotating body of cooling water in said manifold onto the inner wall of said tube in the form of an unbroken rotating film of cooling water which circumscribes the hot reaction gases passing through said tube in heat transfer relationship thereto to rapidly cool said hot reaction gases without loss of chlorine and means arranged to precool said hot reaction gases prior to passing through said cooling tube said precooling means comprising ducts arranged immediately above the inlet of said cooling tube for delivering cool gas to said hot reaction gases.

10. Apparatus for cooling hot reaction gases including gaseous chlorine and particulate $TiO_2$ in suspension according to claim 9 wherein said cooling tube is cylindrical in shape and said transport means comprises tangentially directed slits in the inner wall of said manifold.

11. Apparatus for cooling hot reaction gases including gaseous chlorine and particulate $TiO_2$ in suspension according to claim 9 wherein said cooling tube is frusto-conical in shape and said transport means comprises a weir separating the rotating body of water in said manifold from the inner wall of said frusto-conical tube.

References Cited by the Examiner

UNITED STATES PATENTS

| | | | |
|---|---|---|---|
| 2,495,540 | 1/1950 | Nichols et al. | 239—428 X |
| 2,624,624 | 1/1953 | Kirschbaum | 239—400 X |
| 2,833,627 | 5/1958 | Krchma | 23—202 |
| 2,879,948 | 3/1959 | Seibel | 239—428 X |
| 3,009,687 | 11/1961 | Hendriks | 261—118 X |
| 3,073,712 | 1/1963 | Wigginton et al. | 23—202 X |
| 3,078,148 | 2/1963 | Belknap et al. | 23—202 |
| 3,138,441 | 6/1964 | Krantz | 261—118 X |

FOREIGN PATENTS

| | | |
|---|---|---|
| 1,174,080 | 11/1958 | France. |
| 885,732 | 12/1961 | Great Britain. |

ROBERT A. O'LEARY, *Primary Examiner.*

LLOYD L. KING, *Examiner.*